Aug. 19, 1952 W. A. STONE 2,607,230
RATE GYROSCOPE
Filed Sept. 30, 1950
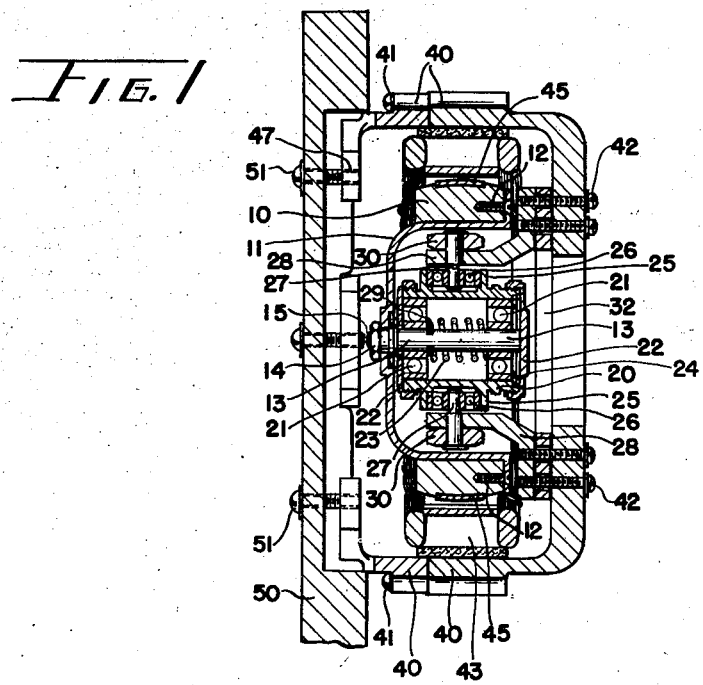
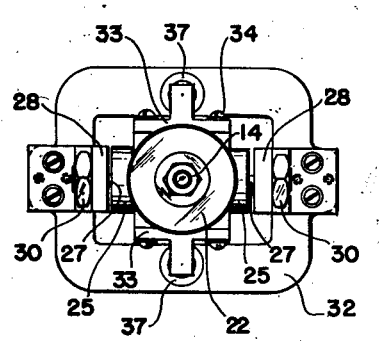
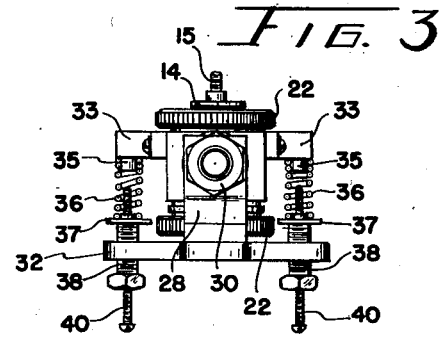
Inventor
WAYNE A. STONE
George H Fisher
Attorney Patented Aug. 19, 1952

2,607,230

UNITED STATES PATENT OFFICE 2,607,230

RATE GYROSCOPE

Wayne A. Stone, St. Louis Park, Minn., assignor to Minneapolis-Honeywell Regulator Company, Minneapolis, Minn., a corporation of Delaware Application September 30, 1950, Serial No. 187,722

19 Claims. (Cl. 74—5.4)

This invention relates to rate gyroscopes and more particularly to improvements in devices of this type with the purpose of increasing the natural or resonant frequency of such devices.

Rate gyroscopes or gyroscopes having one degree of freedom which is restrained by a biasing means are generally old. In recent years devices of this type have been used to a large degree in automatic pilot control systems for aircraft and in other systems where rate signals are required for controlling operations. The design of such devices generally represents a compromise of certain desired output characteristics, such as, sensitivity, speed of response or time lag, and frequency of oscillations sometimes known as natural, resonant or random frequency. Where such devices are used on apparatus or structure which has little or no inherent oscillation or natural frequency, the problem of frequency of the gyroscope is not important as long as it does not approach or become as small as the frequency of the apparatus. With the increase in performance and speed of aircraft, however, the natural frequency of the aircraft has increased appreciably thus making it necessary to increase the natural frequency of rate gyroscopes which are to be used on such aircraft. While the requirements for sensitivity and speed of response are also affected by increased aircraft performance, they are not directly affected by the present invention and hence will not be considered further herein.

The natural frequency of the gyroscope is affected by the present invention since the latter provides an improved gyroscope design by means of which the frequency of the gyroscope is appreciably increased making such a device applicable for use on high speed aircraft having high natural frequencies of oscillation.

For an understanding of the meaning and affect of natural or resonant frequency of a rate gyroscope, reference is made to the following formulas which expresses such a factor in terms of gyroscopic constants and variables as follows:

General formula for resonant frequency:

$$fr = \frac{1}{2\pi}\sqrt{\frac{Kg}{I_{d2}}}$$

$fr$=resonant frequency (cy./sec.).
$K$=spring constant (gm./cm.²/cm.).
$g$=acceleration at gravity—981 cm./sec.²
$I_d$=moment of inertia about gimbal axis (gm./cm.²).

General formula for spring constant:

$$K = \frac{Fx^2}{d}$$

$F$=force applied (gms.).
$x$=radius of F and $d$ (cm.).
$d$=deflection caused by F (cm.).

General formula for force developed by a gyroscope:

$$F = \frac{WI_pN}{535.182x}$$

$W$=rate of turn about the input axis (deg./sec.).
$I_p$=moment of inertia of the rotor about the spin axis (gm./cm.²).
$N$=rate of spinning of the rotor (rev./min.).

Combining the above:

$$fr = \frac{1}{2\pi}\sqrt{\frac{WI_pNxg}{535.182dI_d}}$$

Isolating the constants results in:

$$fr = .0658\sqrt{\frac{WI_pNx}{dI_d}}$$

The ratio $$\frac{Wx}{d}$$

is dependent upon the particular requirements of maximum and minimum turn rates desired, the size of the device, the room available for the radius of the pickoff and spring arm, and the sensitivity of the pickoff. The spin rate of the rotor is limited by bearing and spin motor design requirements.

It may thus be seen that the ratio $I_p/I_d$, that is, the ratio of moment of inertia of the gyroscope rotor about the spin axis to the moment of the inertia about the deflection axis of all parts suspended on the gimbal bearings, is an important means of increasing gyroscope natural frequency without sacrificing sensitivity or shortening bearing life and increasing power requirements by higher rotor spin rates and is the basis for the subject invention.

By removing as many non-rotating parts from the gimbal as possible and concentrating the remainder near center I have reduced the moment of inertia about the gimbal axis and thereby increased the $I_p/I_d$ ratio. An improvement in the $I_p/I_d$ ratio from approximately .5 for conventional rate gyroscopes to approximately 1.8 for the described arrangement has been realized. A further improvement resulted from removing the gyro rotor spin motor field from the gimbal. Flexible leads or other means of carrying electric power to a moving member are not necessary, eliminating a source of friction and improving sensitivity.

It is therefore an object of this invention to provide an improved gyroscope design having a high resonant frequency.

It is also an object of this invention to provide in a rate gyroscope an arrangement of parts wherein the rotor mounting and restraining means for the gyroscope is located within the rotor mass and rotor spinning means near the center of gravity of the device.

It is further an object of this invention to provide a rate gyroscope in which the ratio of the moments of inertia of the rotor mass about the spin axis of the gyroscope to the moment of inertia of the mass with its mounting and restraining means about the displacement axis of the gyroscope is greater than 1.

Another object of this invention is to provide in a rate gyroscope an arrangement of parts in which the spin motor for the gyroscope is located outside of the rotor mass and its associated mounting means with the field element of the spin motor on a relatively fixed part such that special lead in connections are not required for energizing the same.

A still further object of this invention is to provide a rate gyroscope design having a high resonant frequency which is simple and compact in construction and sensitive and accurate in operation.

These and other objects of this invention will become apparent from a reading of the attached specifications together with the drawings wherein:

Figure 1 is a vertical sectional view of a gyroscope showing the location and arrangement of parts, Figure 2 is a side elevation view of the gyroscope with the cover, rotor and motor removed and the view of remaining mounting structure rotated counter-clockwise through 90°, and Figure 3 is a top plan view of the gyroscope with the cover, rotor and spin motor removed and the view of the mounting structure rotated clockwise through 90°.

The rate gyroscope design as disclosed in Figure 1 utilizes a rotor or mass 10 which is annular or ring-shaped in form with a spherically shaped outer periphery and is mounted on a cup-shaped supporting structure 11, being secured thereto by screws 12 or any other suitable means. The supporting structure 11 is mounted on a shaft 13 concentric therewith, the shaft threading through an aperture in the supporting structure and being secured thereto by means of a nut 14 mounted on a threaded extremity 15 of the shaft 13 to secure the shaft to the support structure. While the rotor 10 and the supporting structure 11 together with the shaft 13 have been shown as a plurality of units, it is to be understood that the mass 10 and support 11 may be integral with one another and may also include the shaft 13 as a machined part integral with a support 11. The shaft 13 extends into the opening in the cup-shaped support structure 11 and therein is mounted within a bearing housing 20 which is generally cylindrical in form and mounts a pair of ball bearing members 21 at either extremity thereof for journalling the shaft 13. The bearing housing also includes a pair of removable capped members 22 at either extremity thereof by means of which the bearings may be removed, inserted or inspected. A spring member 23 is positioned around the shaft between the bearing members 21 which with the aid of stop rings 24, 29 mounted on the housing 20 and shaft 13 respectively spaces the bearing members 21 along the shaft. The operative engagement between the shaft 13 and the bearing 21 of housing 20 journals the shaft within the bearing housing 20 and defines an axis of rotation for the rotor mass 10 known as the spin axis.

Bearing housing 20 along its extent has formed thereon a first pair of circular flange members 25 which extend normal to the longitudinal dimension of the housing and the spin axis defined above. The flange members 25 define openings of circular cross-section within which are positioned a second pair of ball bearing members 26 and with the ball bearing members being secured therein by any suitable means such as press fitting. The bearing members 26 cooperate with the extremities of a pair of pivot members 27 which are attached to the extremities of a pair of L-shaped brackets by means of retaining nuts 30 that provide steady cooperation of the pivots 27 and bearings 26 to form a second axis for the gyroscope displaced 90° from or normal to the spin axis defined above, this second axis being known as the axis of displacement of the gyroscope. Rotor mass 10, as noted above, has a spherical outer periphery to allow for movement about the two mutually perpendicular axes previously defined. As will become apparent as the disclosure proceeds, the L-shaped brackets 28 are a relatively fixed part of the rotor mounting structure which includes a bearing housing 20 with the bearings 21 and shaft 13 and the bearings 26 and cooperating pivots 27. These L-shaped brackets 28 are so attached to the rotor mounting structure to support the pivots 27 at a location within the opening defined by the cup-shaped structure 11 with the L-shaped members extending out of the opening and being attached to an O-shaped mounting frame 32.

As will be seen in Figures 2 and 3, bearing housing 20 further includes a second set of flanges 33 attached to the housing by means of screws 34 and located or displaced 90° from the flanges 25. As shown in Figure 3, the ends of the flanges 33 have mounting plugs 35 thereon over which are positioned a pair of helical springs 36 the purposes of which will be later noted. The opposite extremity of springs 36 rest against flanges 37 which are mounted on screw members 38, the screw members being threaded through tapped apertures in the O-shaped mounting frame 32 to hold the spring members 36 in compression and bias the housing 20 against movement about the second named axis defined above in either direction. Adjustment of the screw members 38 within the apertures of the plate or frame 32 will vary the compression of the springs. Also included in the screws 38 are a second pair of screw members 40 which thread through apertures in the screw members 38 and near abutting relationship with the mounting plugs 35 to limit the movement of the bearing housing 20 about the second named axis of rotation. The second named screw members 40 act as adjustable limit stops for the displacement axis of the gyroscope. The spring members 36 when held in a compressed relationship between the flanges 33 and frame 32 act as a restraining means or restraint for the bearing housing 20 to limit or restrain in a well known manner the displacement of the rotor mass about the axis of displacement. These restraining springs 36 supply a torque about the second named axis to act against the precessive movement of the gyroscope rotor mass when the rotor mass 10 is spinning at a high speed and the structure upon which the gyroscope is mounted is displaced with respect to its original position, such as, for example, in the turning of an aircraft. A suitable signal generator or electrical control device (not shown) is generally mounted on gyroscopes of this type to supply a signal in proportion to the displacement of the gyroscope about its restrained axis when the frame upon which the gyroscope is mounted is so displaced.

However, since this portion of the gyroscope forms no part of the present invention details of such structure have been eliminated here for simplicity. However, it is to be understood that a control device such as a potentiometer winding and wiper would be mounted on the O-shaped frame and bearing housing respectively to be operated by relative movement between the rotor mass and the frame about the displacement axis defined by pivots 27, thereby giving a signal output proportional to rate of displacement of the gyroscope.

Enclosing the rotor mass 10 and its associated mounting structure, and mounting the O-shaped frame 32 is a cover member 40 generally cylindrical in form and being comprised of two parts held together in assembled relationship by means of screws 41. Suitable screw means 42 similarly hold the cover member 40, the frame 32 and the L-shaped brackets 28 in assembled relationship. Within the cover member and mounted on the inner periphery thereof by means not shown is a field element 43 of an electric motor adapted to spin the rotor mass 10 on its axis. The field element 43 is a conventional polyphase induction motor stator and cooperates with a squirrel cage element 45 which is mounted on the outer periphery of the rotor mass 10 and adjacent the field member 43. The operation of this motor is conventional, the motor winding being so positioned on the field element and so energized from an A. C. source of power that a rotating flux field cooperates with the squirrel cage structure which is suitably attached to the rotor mass 10 such that the rotor mass is driven at a relatively high speed. Since the cover 40 and hence the field structure 43 are relatively fixed parts of the gyroscope it will be evident that electrical connections to the field elements which are not shown in the drawings do not require special connectors running between relatively movable parts of the gyroscope. The cover member 40 of the gyroscope has suitable tapped flanges 47 of an opposite extremity thereof such that it may be mounted on a frame such as is indicated at 50 by means of screws 51.

The operation of the subject gyroscope is generally conventional to the extent that the rotor is rotated at a relatively high rate of speed when its spin motor is energized. The rotor mass is journalled in a housing which itself is pivoted on a relatively fixed part and a pair of spring members or restraining means restrain movement of the rotor bearing housing about said axis in a well known manner of rate gyroscopes. Such restraint about the displacement axis as the gyroscope is precessed operates to produce precessive movement which is proportional to rate of displacement of the gyroscope and about the frame on which it is mounted. This particular arrangement of parts provides for a relatively high moment of inertia of the gyroscope about the spin axis while still maintaining a substantially compact and simple structure. Further, by placing the mounting means for the gyroscope within the opening in the rotor supporting structure, the mass and displacement axis for this portion of the gyroscope is held to a relatively small dimension, consequently reducing the moment of inertia of the gyroscope about the displacement axis. In this manner the frequency of the gyroscope is increased making such a device more adaptable to high performance aircraft.

In considering this invention it should be kept in mind that the present disclosure is intended to be illustrative only and the scope of the invention is to be determined only by the appended claims.

I claim as my invention:

1. In a device for determining rate and sense of rotation: a shaft; first means including a pair of spaced bearing members journalling said shaft; second means including a second bearing means for pivoting said first means about an axis normal to said shaft; biasing means attached between said first means and said second means and acting normal to said axis for restraining movement of said first means about said axis; a cup-shaped member including an annular mass mounted thereon secured to one end of said shaft and encircling said first and second means and said biasing means; a frame member mounting said second means; and a motor means including an inductor element and a stator element mounted in part on said annular mass and in part on said frame member and encircling said shaft, said first and second means and said biasing means.

2. In a device for determining rate and sense of rotation: a shaft, first means including a pair of spaced bearing members journalling said shaft; second means including a second bearing means for pivoting said first named means about an axis normal to said shaft; biasing means attached between said first means and said second means and acting normal to said axis for restraining movement of said first means about said axis; a cup-shaped member including an annular mass mounted thereon secured to one end of said shaft and encircling said first and second means and said biasing means; a frame member mounting said second means; and a motor means including an inductor element and a stator element mounted in part on said annular mass and in part on said frame member and encircling said shaft, said first and second means and said biasing means; said device having a center of gravity located at said shaft between said spaced bearing members.

3. In a device for determining rate and sense of rotation: a shaft; first means including a pair of spaced bearing members journaling said shaft; second means including a second bearing means for pivoting said first means about an axis normal to said shaft; biasing means attached between said first means and said second means and acting normal to said axis for restraining movement of said first means about said axis; a cup-shaped member including an annular mass mounted thereon secured to one end of said shaft and encircling said first and second means and said biasing means; a frame member mounting said second means; and a motor means including an inductor element and a stator element mounted in part on said annular mass and in part on said frame member and encircling said shaft, said first and second means and said biasing means; said frame encircling said cup-shaped member, said first and second means and said biasing means.

4. In a device for determining rate and sense of rotation a shaft; first means including a pair of spaced bearing members journalling said shaft; second means including a second bearing means for pivoting said first means about an axis normal to said shaft; biasing means attached between said first means and said second means and acting normal to said axis for restraining movement of said first means about said axis; a cup-shaped member including an annular mass mounted thereon secured to one end of said shaft and encircling said first and second means and said biasing means; a frame member mounting said second means; and a motor means including an inductor element and a stator element mounted in part on said annular mass and in part on said frame member and encircling said shaft, said first and second means and said biasing means; said frame encircling said cup-shaped member, said first and second means and said biasing means; and means mounted on said second means for varying the length of said biasing means.

5. In a device for determining rate and sense of rotation; a shaft; first means including a pair of spaced bearing members journalling said shaft; second means including a second bearing means for pivoting said first means about an axis normal to said shaft; biasing means positioned between said first means and said second means and acting normal to said axis for restraining movement of said first means about said axis; a rotor mass including a cup-shaped frame mounted on said shaft and encircling said first and second means; motor means including an inductor member and a field member for spinning said rotor mass on said shaft; and cover means enclosing said rotor mass, said first and second means, and mounting said second means; said field member of said motor being mounted on said cover means encircling said rotor mass and said inductor member being mounted on said rotor mass.

6. In a device for determining rate and sense of rotation; a shaft; first means including a pair of spaced bearing members journalling said shaft; second means including a second bearing means for pivoting said first means about an axis normal to said shaft; biasing means positioned between said first means and said second means and acting normal to said axis for restraining movement of said first means about said axis; a rotor mass including a cup-shaped frame mounted on said shaft and encircling said first and second means; motor means including an inductor member and a field member for spinning said rotor mass on said shaft; and cover means enclosing said rotor mass, said first and second means, and mounting said second means; said field member of said motor being mounted on said cover means encircling said rotor mass and said inductor member being mounted on said rotor mass; said device having a center of gravity located at said shaft between said spaced bearing members.

7. In a device for determining rate and sense of rotation; a shaft; first means including a pair of spaced bearing members journalling said shaft; second means including a second bearing means for pivoting said first means about an axis normal to said shaft; biasing means positioned between said first means and said second means and acting normal to said axis for restraining movement of said first means about said axis; a rotor mass incluuding a cup-shaped frame mounted on said shaft and encircling said first and second means; motor means including an inductor member and a field member for spinning said rotor mass on said shaft; cover means enclosing said rotor mass, said first and second means, and mounting said second means; said field member of said motor being mounted on said cover means encircling said rotor mass and said inductor member being mounted on said rotor mass; and means mounted on said second means for varying the strength of said biasing means.

8. In a device of the class described, a shaft, means mounting said shaft including a first bearing means journalling said shaft and a second bearing means pivoting said first bearing means about an axis normal to said shaft, said mounting means being attached to a relatively fixed part, biasing means attached to said fixed part and said first bearing means for restraining movement of said shaft about said axis, a cup-shaped mass attached to said shaft and encircling said mounting means, and means for rotating said shaft and said mass mounted in part on said mass and in part on said fixed part, said last named means encircling said mass and said mounting means.

9. In a device of the class described, a shaft, means mounting said shaft including a first bearing means journalling said shaft and a second bearing means pivoting said first bearing means about an axis normal to said shaft, said mounting means being attached to a relatively fixed part, biasing means attached to said fixed part and said first bearing means for restraining movement of said shaft about said axis, a cup-shaped mass attached to said shaft and encircling said mounting means, and means for rotating said shaft and said mass mounted in part on said mass and in part on said fixed part, said last named means encircling said mass and said mounting means, the center of gravity of said shaft and said mass with its associated mounting means being located within said first named bearing means.

10. In a device of the class described, a shaft, means mounting said shaft including a first bearing means journalling said shaft and a second bearing means pivoting said first bearing means about an axis normal to said shaft, said mounting means being attached to a relatively fixed part, biasing means attached to said fixed part and said first bearing means for restraining movement of said shaft about said axis, a cup-shaped mass attached to said shaft and encircling said mounting means, means for rotating said shaft and said mass mounted in part on said mass and in part on said fixed part, said last named means encircling said mass and said mounting means, and means for varying the effect of said biasing means including adjustable screw means attached on said second bearing means.

11. In a rate gyroscope, a rotor, means journalling said rotor including a shaft, said rotor having a relatively large diametrical dimension to give a large moment of inertia for said rotor with respect to an axis defined by said shaft, mounting means for said rotor and said shaft including a pivot means defining a second axis of rotation normal to said first axis, a biasing means attached between said shaft and said mounting means for restraining movement of said rotor and said shaft about said second axis, said mounting means having a smaller diametrical dimension than said rotor such that the moment of inertia of said rotor and shaft with its mounting means about said second axis is less than said first named moment of inertia.

12. In a rate gyroscope, a rotor, means including a shaft for journalling said rotor, means mounted in part on a relatively fixed part and in part on said rotor for spinning said rotor at a high speed, said rotor having a relatively large diametrical dimension to give a large moment of inertia with respect to an axis defined by said shaft, mounting means for said rotor and said shaft including a pivot means defining a second axis of rotation normal to said first named axis, and a biasing means for restraining movement of said rotor and said shaft about said second axis, said biasing means being mounted in part on said relatively fixed part and in part on said pivot means, said mounting means and said biasing means having smaller diametrical dimensions than said rotor such that a moment of inertia of said rotor and shaft with its associated mounting and biasing means about said second axis is less than said first named moment of inertia.

13. In a device of the class described, a rotor mass, means including a shaft for mounting said rotor mass for rotational movement, a second means for pivoting said first named means and said rotor mass about an axis normal to said shaft, said last named means being attached to a relatively fixed part, biasing means attached to said fixed part and said first named means for restraining movement of said rotor mass and said shaft about said axis, said rotor mass being cup-shaped in form and encircling said first and second named means, and means for rotating said rotor mass mounted in part on said fixed part and in part on said mass.

14. In a device of the class described, a rotor mass, means including a shaft for mounting said rotor mass for rotational movement, a second means for pivoting said first named means and said rotor mass about an axis normal to said shaft, said last named means being attached to a relatively fixed part, biasing means attached to said fixed part and said first named means for restraining movement of said rotor mass and said shaft about said axis, said rotor mass being cup-shaped in form and encircling said first and second named means, and means for rotating said rotor mass mounted in part on said fixed part and in part on said mass, said fixed part encircling said rotor mass and said first, second and third named means.

15. In a device for determining rate and sense of rotation: a rotor mass; means including a shaft and a pair of spaced bearing means for mounting said rotor mass for rotational movement; said means including a second bearing means for pivoting said rotor mass and said first named means about an axis normal to said shaft; biasing means positioned between said first named means and said last named means and acting normal to said axis for restraining movement of said first named means and said rotor mass about said axis; said rotor mass being cup-shaped in form and encircling said first and second named means; a frame member mounting said second named means; and motor means including an inductor element and a stator element mounted in part on said rotor mass and in part on said frame member and encircling said first and second named means and said biasing means.

16. In a device of the class described, in combination; a shaft; first means including a pair of spaced bearing members journalling said shaft; second means including a second bearing means for pivoting said first means about an axis normal to said shaft; a cup-shaped member including an annular mass mounted thereon secured to one end of said shaft and encircling said first and second means; a frame member mounting said second means; and a motor means including an inductor element and a stator element mounted in part on said annular mass and in part on said frame member and encircling said shaft, said first and second means; said frame encircling said cup-shaped member, said first and second means.

17. In a device of the class described, comprising; a shaft; first means including a pair of spaced bearing members journalling said shaft; second means including a second bearing means for pivoting said first means about an axis normal to said shaft; a rotor mass including a cup-shaped frame mounted on said shaft and encircling said first and second means; motor means including an inductor member and a field member for spinning said rotor mass on said shaft; and cover means enclosing said rotor mass, said first and second means, and mounting said second means; said field member of said motor being mounted on said cover means encircling said rotor mass and said inductor member being mounted on said rotor mass; said device having a center of gravity located at said shaft between said spaced bearing members.

18. In a rate gyroscope, a rotor, means journalling said rotor including a shaft, said rotor having a relatively large diametrical dimension to give a large moment of inertia to said rotor with a respect to an axis defined by said shaft, mounting means for said rotor and said shaft including a pivot means defining a second axis of rotation normal to said first axis, restraining means mounted between said first named means and said mounting means for restraining rotation of said rotor about said second axis of rotation, said mounting means having a smaller diametrical dimension than said rotor such that the moment of inertia of said rotor and said shaft with its mounting means about said second axis is less than said first named moment of inertia.

19. In a rate gyroscope, a rotor, means including a shaft for journalling said rotor, means mounted in part on a relatively fixed part and in part on said rotor for spinning said rotor to high speed, said rotor having a relatively large diametrical dimension to give a large moment of inertia with respect to an axis defined by said shaft, mounting means for said rotor and said shaft including pivot means defining a second axis of rotation normal to said first named axis, restraining means mounted between said first named means and said mounting means for restraining movement of said gyroscope about said second axis, said mounting means having a smaller diametrical dimension than said rotor such that the moment of inertia of said rotor and said shaft with its associated mounting means about said second axis is less than said first named moment of inertia.

WAYNE A. STONE.

REFERENCES CITED

The following references are of record in the file of this patent:

UNITED STATES PATENTS

| Number | Name | Date |
| --- | --- | --- |
| 1,309,636 | Klahn | July 15, 1919 |
| 1,984,859 | Bates | Dec. 18, 1934 |
| 2,378,858 | Mehan | June 19, 1945 |
| 2,452,335 | Stoner | Oct. 26, 1948 |